United States Patent [19]

Higaki et al.

[11] Patent Number: 4,503,097
[45] Date of Patent: Mar. 5, 1985

[54] PAINT-FINISHING COMPOSITION FOR A CEMENT BASE MATERIAL

[75] Inventors: Hiromichi Higaki; Nobuyuki Miyazaki, both of Yokohama, Japan

[73] Assignee: Asahi Glass Company Ltd., Tokyo, Japan

[21] Appl. No.: 506,618

[22] Filed: Jun. 22, 1983

[30] Foreign Application Priority Data

Jun. 28, 1982 [JP] Japan .................... 57-109829

[51] Int. Cl.$^3$ .................. C08L 27/12; B32B 27/00; B32B 15/00; D02G 3/00
[52] U.S. Cl. .................. 427/386; 427/393.6; 427/407.1; 427/419.5; 427/419.8; 428/421; 524/401; 524/507; 524/512; 524/544; 524/545; 526/247
[58] Field of Search ............ 524/544, 545, 401, 507, 524/512; 526/247; 427/386, 407.1, 393.6, 419.5, 419.8, 421

[56] References Cited

U.S. PATENT DOCUMENTS

| 3,651,003 | 3/1972 | Bechtold | 524/544 |
|---|---|---|---|
| 4,046,727 | 9/1977 | Itoh et al. | 523/220 |
| 4,316,836 | 2/1982 | Aufdermarsh | 524/535 |
| 4,345,057 | 8/1982 | Yamabe et al. | 526/247 |
| 4,368,308 | 1/1983 | Yamabe et al. | 526/247 |

OTHER PUBLICATIONS

Derwent Abst. 27063 E/14, (J57034108), Asahi Glass, (2-1982).
Derwent Abst. 63020 D/35, (J56084711), Asahi Glass, (7-1981).
Derwent Abst., 24551, C/14, (J55025416), Asahi Glass, (2-1980).
Derwent Abst., 46614 D/26, (J56051346), Asahi Glass, (5-1981).

Primary Examiner—Herbert J. Lilling
Attorney, Agent, or Firm—Oblon, Fisher, Spivak, McClelland & Maier

[57] ABSTRACT

A paint-finishing composition for a cement base material, which comprises, as dissolved or dispersed in a solvent, 100 parts by weight of a solvent-soluble fluorinated polymer having cure sites and an intrinsic viscosity of from 0.05 to 2.0 dl/g as measured at 30° C. in tetrahydrofuran, from 0.1 to 100 parts by weight of a curing agent and from 5 to 500 parts by weight of a coloring agent.

7 Claims, No Drawings

PAINT-FINISHING COMPOSITION FOR A CEMENT BASE MATERIAL

The present invention relates to a paint-finishing composition for a cement base material and a method for paint-finishing a cement base material by means of the composition. More particularly, the present invention relates to a paint-finishing composition containing a special fluorinated polymer, whereby a paint-finish of a cement base material having improved durability is obtainable.

Cement base materials such as concrete materials, asbestos slates, calcium silicate materials or plaster-slag materials are widely used in the field of building and construction materials. A method for paint-finishing is known wherein a cured paint film of a finishing material is formed on such a cement base material with an intermediate layer interposed between the base material and the paint film, primarily for the purpose of imparting a beautiful outer appearance.

As such a finishing material, it has been common to use an acryl urethane paint, an acryl melamine paint, a polyester paint, a thermoplastic acryl resin paint or the like. However, there have been various problems in the use of these finishing materials. For instance, cracks or blisters are likely to be formed in the paint film of the finishing material, or in an extreme case, peeling or paint-off is likely to be caused, by exudation of an alkali from the base material or by the action of the sun light, wind and rain, whereby the outer appearance is likely to be impaired. Thus, there has been a drawback that it is required to repaint the finishing material frequently.

The present inventors have conducted extensive researches to overcome the above problems and as a result, have found that the durability of the paint finish can be remarkably improved by using a finishing material composed of a composition containing a certain specific fluorinated polymer. Thus, the present invention has been accomplished based on this discovery.

The present invention provides a paint-finishing composition for a cement base material, which comprises, as dissolved or dispersed in a solvent, 100 parts by weight of a solvent-soluble fluorinated polymer having cure sites and an intrinsic viscosity of from 0.05 to 2.0 dl/g as measured at 30° C. in tetrahydrofuran, from 0.2 to 100 parts by weight of a curing agent and from 5 to 500 parts by weight of a coloring agent.

The present invention also provides a method for paint-finishing a cement base material which comprises forming a cured paint film of a finishing material on the cement base material with an intermediate layer interposed between the base material and the paint film, wherein the above-mentioned paint-finishing composition is used as the finishing material.

Now, the present invention will be described in detail with reference to the preferred embodiments.

In the present invention, it is important to use as the finishing material, a composition containing the specific fluorinated polymer. The fluorinated polymer has cure sites and an intrinsic viscosity of from 0.05 to 2.0 dl/g, preferably from 0.07 to 0.8 dl/g, as measured at 30° C. in tetrahydrafuran, and it is a solvent-soluble type. If the polymer does not have cure sites, the paint film thereby obtained will be poor in its durability. If the intrinsic viscosity is too low, the mechanical strength of the paint film tends to be low, and if the intrinsic viscosity is too high, the concentration of the solution will have to be decreased to adjust the viscosity of the composition, whereby the processability will be impaired. Further, a solvent-insoluble polymer is not suitable for use since it is difficult to form a uniform paint film with such a polymer.

In the present invention, not only a polymer obtained by addition polymerization but also a polymer obtained by condensation polymerization may be used as the fluorinated polymer. As the polymer obtained by addition polymerization, there may be mentioned a polymer or copolymer obtained by addition polymerization of a fluorine-containing unsaturated compound and containing cure sites such as hydroxyl groups, epoxy groups, carboxyl groups, acid amide groups, ester groups, unsaturated bonds, active hydrogen atoms or halogen atoms. As the polymer obtained by condensation polymerization, there may be mentioned an epoxy resin having fluorine-containing bifunctional groups or a condensation product of a fluorine-containing diol, dibasic acid, dibasic acid anhydride or diisocyanate which contains ester bonds, urethane bonds or urea bonds.

As such a fluorinated polymer, an addition polymerization type polymer such as a copolymer of a fluoroolefin with a hydrocarbon-type vinyl ether may preferably be used from the viewpoints of the weather resistance and the mechanical properties of the cured paint film and its availability.

As the fluoroolefin-vinyl ether copolymer preferably used in the present invention, there may be mentioned a copolymer comprising from 30 to 70 molar % of fluoroolefin units and from 70 to 30 molar % of vinyl ether units. Tetrafluoroethylene and chlorotrifluoroethylene may be mentioned as a preferred fluoroethylene component, and an alkyl vinyl ether containing a straight-chained, branched or cyclic alkyl group having from 2 to 8 carbon atoms may be mentioned as a preferred vinyl ether component.

As a comonomer which introduces cure sites to such a copolymer, a vinyl ether containing a functional group such as hydroxyalkyl vinyl ether or a glycidyl vinyl ether is preferably used. Such a copolymer preferably contains not more than 30 molar % of the hydroxy alkyl vinyl ether or glycidyl vinyl ether units.

The above-mentioned copolymer may be prepared by conducting copolymerization of a mixture of monomers in a predetermined ratio in the presence or absence of a polymerization medium by using a polymerization initiator or by application of a polymerization initiating source such as ionizable radiation.

According to the present invention, a curing agent such as a polyfunctional compound reactive with the cure sites of the fluorinated polymer is incorporated in the composition containing the fluorinated polymer in a proportion of from 0.1 to 100 parts by weight, preferably from 0.5 to 50 parts by weight, relative to 100 parts by weight of the polymer. Further, a curing assistant or a curing catalyst may optionally be incorporated.

For instance, in the case of a fluorinated polymer having hydroxyl groups as the cure sites, a diisocyanate or a titanium alkoxide is preferably used as the curing agent to obtain a composition which is curable at a normal temperature. If it is desired to obtain a heat curable composition, a melamine curing agent, a urea resin curing agent or a polybasic acid curing agent which is commonly used in a heat curable acryl paint, may effectively be used as the curing agent. As the melamine curing agent, there may be mentioned butylated melamine, methylated melamine or an epoxy-modified melamine. The degree of the modification may be selected within a range of from 0 to 6 depending upon the particular purpose. Likewise, the self-condensation degree may optionally be selected. As the urea resin, there may be mentioned methylated urea or butylated urea. As the polybasic acid curing agent, a long-chained aliphatic dicarboxylic acid, an aromatic polybasic carboxylic acid or its anhydride or a block polyisocyanate is useful. When a melamine curing agent or a urea curing agent is used, it is possible to facilitate the curing by an addition of an acidic catalyst. As another example, in the case of a fluorinated polymer having epoxy groups as the cure sites, an amine, a carboxylic acid, a phenol or an alcohol is useful as the curing agent. In this case, a polyhydroxy compound, particularly a non-aromatic diol, is useful as curing assistant.

It is desirable that such a curing system is optionally selected depending upon the nature of the base material. For instance, a normal temperature curing system is preferably employed for on-the-spot application as in the case of the paint finish of a concrete structure, and a heat curing system may be employed without trouble when the application is carried out in a factory as in the case of the paint finish of asbestos slate plates.

In the present invention, it is important that a coloring agent is incorporated in the composition in an amount of from 5 to 500 parts by weight, preferably from 10 to 200 parts by weight, relative to 100 parts by weight of the fluorinated polymer. The coloring agent serves not only to impart a beautiful outer appearance but also to prevent the penetration of the ultra-violet ray in the sun light by its shielding effect, whereby the deterioration of the intermediate layer will be prevented and the durability of the paint finish will be improved.

If the amount of the coloring agent is too small, no adequate effectiveness will be obtained. On the other hand, an excessive amount tends to lead to deterioration of the paint film and a decrease of the durability.

As the coloring agent, an inorganic pigment, especially a calcined pigment, is preferred from the viewpoint of the prevention of discoloration, although an organic type pigment such as phthalocyanine blue may also be used.

In the present invention, the intermediate layer serves as a medium for the adhesion of the paint film of the finishing material with the cement base material, and it also serves to cover voids on the surface of the base material and to prevent exudation of an alkali from the base material. For such an intermediate layer, an epoxy resin paint, a phenol alkyd resin paint and synthetic rubber paint which are commonly used for such a purpose, and an ethylene-vinyl acetate copolymer paint, a vinyl chloride copolymer sol paint and a urethane-modified epoxy resin paint may preferably be used.

Such an intermediate layer may not necessarily be a single layer formed as a covering layer on the base material, and may have a multi-layered structure wherein a base layer made of the above-mentioned material is formed in direct contact with the base material and an additional layer of an epoxy resin paint or a thermoplastic acryl resin paint containing cement·is formed thereon, or a pattern-forming layer of an epoxy resin paint or a thermoplastic acryl paint containing a fine aggregate material such as lime stone sand or silica sand or a filler such as clay or talc is formed on a similar base layer.

According to the present invention, a paint finish having superior durability is obtainable. Accordingly, the present invention is extremely useful particularly in the field of ceramic construction materials.

Now, the present invention will be described in further detail with reference to Examples. However, it should be understood that the present invention is by no means limited to these specific examples.

EXAMPLE 1

A white paint composition having the following composition was prepared by using a fluorinated polymer comprising chlorotrifluoroethylene, cyclohexylvinyl ether and hydroxybutyl vinyl ether in molar ratios of 50, 40 and 10%, respectively, and having a hydroxyl group value of 50 mgKOH/g and an intrinsic viscosity of 0.23 dl/g as measured at 30° C. in tetrahydrofuran.

The above-mentioned fluorinated polymer: 100 parts by weight
Titanium oxide: 42 parts by weight
Xylene/methylisobutylketone (50/50) mixed solvent: 200 parts by weight To the white paint composition, 18 parts by weight of an isocynate curing agent (Colonate EH, manufactured by Nippon Polyurethane Co.) was added and uniformly mixed. By means of a spray machine, the mixture thereby obtained was applied onto a slate plate having a thickness of 6 mm which was preliminarily prepared by applying the following paints to form an intermediate layer having a double layered structure. The coated slate plate was left for one week at room temperature, and then subjected to various tests for the paint film properites. In each test, no abnormality in the paint film was observed and it was confirmed that the paint finish had superior durability.

Formation of the intermediate layer

First layer: a paint film of an ethylene-vinyl acetate copolymer paint
Second layer: an epoxy resin emulsion paint containing 60% by weight of cement

| Tests for the paint film properties | |
|---|---|
| (1) Accelerated weather resistance test (in accordance with JIS A-1415) Sunshine Weather Meter | |
| Black panel temperature: | 63° C. |
| Humidity: | 50% RH |
| Water spray: | water was continuously sprayed for 12 minutes every hour |
| (2) Warming-cooling repeating test (in accordance with JIS A-6910) | |
| Cycle: Immersion in water: | 18 hours |
| Low temperature storage: (−20°C.) | 3 hours |
| High temperature storage: (50° C.) | 3 hours |
| (3) Alkali resistance test Immersion in a saturated slaked lime aqueous solution | |
| (4) Gloss 60°—60° specular gloss | |

EXAMPLES 2 to 8 and COMPARATIVE EXAMPLES 1 and 2

Paint films having the compositions identified in Tables 1 and 2 were prepared and they were subjected to various property tests. The results thereby obtained are shown in Table 3. It is evident from the results that the paint finish of the cement base materials according to the present invention is superior to the paint finish obtained by the conventional methods.

TABLE 1

| | Base material | Intermediate layer Materials | Intermediate layer Thickness μm | Finishing material Composition | Finishing material Film thickness μm |
|---|---|---|---|---|---|
| Example | | | | | |
| 1 | A | F/G | 10/1000 | J | 40 |
| 2 | B | F/G | 10/1000 | J | 40 |
| 3 | C | F/G | 10/1000 | J | 40 |
| 4 | D | H | 15 | J | 40 |
| 5 | E | F | 15 | J | 40 |
| 6 | A | H | 15 | K | 20 |
| 7 | A | H | 15 | L | 20 |
| 8 | A | H | 15 | M | 20 |
| Comparative Example | | | | | |
| 1 | A | H | 15 | N | 60 |
| 2 | B | F/G | 10/1000 | N | 60 |

Notes:
A: Slate plate
B: Concrete plate
C: Glass fiber-reinforced concrete plate
D: Plaster-slag plate
E: Light weight concrete plate
F: Ethylene-vinylacetate copolymer
G: Epoxy resin containing 60% by weight of cement
H: Epoxy resin
J–N: See Table 2

TABLE 2

| | Polymers Composition | Polymers Intrinsic viscosity | Curing agents Kind | Curing agents Amount (Phr) |
|---|---|---|---|---|
| J | Same as Example 1 | Same as Example 1 | Same as Example 1 | Same as Example 1 |
| K | Copolymer of chlorotrifluoroethylene, cyclohexyl vinyl ether and glycidyl vinyl ether in molar ratios of 52, 10 and 38% | 0.19 | Dimethyl cyclohexylamine hydrochloride | 1 |
| L | Condensation product of HOCH$_2$(CF$_2$)$_4$CH$_2$OH with epichlorohydrin | 0.11 | Isocyanate curing agent (Desmodule N, manufactured by Sumitomo Bayer) | 14 |
| M | Same as Example 1 | Same as Example 1 | Melamine curing agent (Cymel 303, manufactured by Mitsui Toatsu) | 6 |
| N | Acryl urethane resin hydroxyl group value: 50 mgKOH/g | — | Same as Example 1 | 20 |

The coloring agent in each of J to N was the same as the one used in Example 1.

TABLE 3

| | Accelerated weather resistance test Exposure time (hrs) | Gloss relation (%) | Discoloration (yellow index) | Outer appearance | Warming-cooling cycle Number of cycles | Warming-cooling cycle Result | Alkali resistance Number of days | Alkali resistance Result |
|---|---|---|---|---|---|---|---|---|
| Example | | | | | | | | |
| 1 | 1000 | 102 | 3 | Normal | 2 | Normal | 7 | Normal |
| | 2000 | 105 | 4 | " | 4 | " | 10 | " |
| | 4000 | 93 | 4 | " | 10 | " | 15 | " |
| 2 | 4000 | 91 | 4 | " | 10 | " | 15 | " |
| 3 | 4000 | 90 | 4 | " | 10 | " | 15 | " |
| 4 | 4000 | 93 | 4 | " | 10 | " | 15 | " |
| 5 | 4000 | 89 | 4 | " | 10 | " | 15 | " |
| 6 | 2000 | 98 | 4 | " | 4 | " | 7 | " |
| | 4000 | 91 | 4 | " | 10 | " | 15 | " |
| 7 | 2000 | 94 | 4 | " | 4 | " | 7 | " |
| | 4000 | 86 | 4 | " | 10 | " | 15 | " |
| 8 | 4000 | 86 | 4 | " | 10 | " | 15 | " |
| Comparative Example | | | | | | | | |
| 1 | 1000 | 65 | 10 | Normal | 2 | Fine blister formed | 7 | Cracks appeared |
| | 2000 | 14 | 28 | Fine cracks appeared | 4 | Substantial blister formed | 10 | Blister formed |
| 2 | 1000 | 59 | 9 | Normal | 2 | Normal | 7 | Blister formed |
| | 2000 | 17 | 21 | Fine cracks appeared | 4 | Blister formed | 10 | Blister formed |

EXAMPLE 9

The tests were conducted in the same manner as in Example 6 except that 25 phr of titanium oxide and 25 phr of calcined yellow pigment were used instead of 42 phr of titanium oxide. The results thereby obtained were substantially the same as those obtained in Example 6. In this case, the color difference ΔE after the 4000 hours of accelerated weather resistance test was as small as 2.

We claim:

1. A method for finishing a cement base material comprising:
   (a) forming at least one intermediate layer, which is formed of a material selected from the group consisting of an epoxy resin, a phenol alkyd resin, a synthetic rubber, an ethylenevinyl acetate copolymer, a vinyl chloride copolymer sol and a urethane-modified epoxy resin paint, on the cement base in the form of a polymeric resin or paint; said layer having an outer surface; and
   (b) forming a cured paint layer of a composition comprising:
      100 parts by weight of a solvent-soluble fluorinated polymer containing cure sites selected from the group consisting of hydroxyl groups, epoxy groups, carboxyl groups, acid amide groups, ester groups, unsaturated bonds, active hydrogen atoms and halogen atoms, and an intrinsic viscosity of from 0.05 to 2.0 dl/g as measured at 30° C. in tetrahydrofuran;
      from 0.1 to 100 parts by weight of a curing agent, and
      from 5 to 500 parts by weight of a coloring agent; said composition dissolved or dispersed in a solvent.

2. The method of claim 1 wherein the fluorinated polymer is a copolymer of a fluoroolefin with a hydrocarbon-type vinyl ether comprising from 30 to 70 molar % of fuoroolefin units, from 70 to 30 molar % of vinyl ether units, and not more than 30 molar % of hydroxyl vinyl ether units.

3. The method of claim 1 wherein the finishing material is curable at a normal temperature.

4. The method of claim 1 wherein the curing agent utilized for curing the finishing material is diisocyanate or a titanium alkoxide.

5. The method of claim 1 wherein the coloring agent utilized in the finishing material is an inorganic pigment.

6. The method of claim 1 further comprising between the intermediate layer and the cure paint layer:
   (i) a second intermediate layer of an epoxy resin or a thermoplastic acryl resin containing cement; said second layer formed on the previous intermediate layer.

7. The method of claim 1 further comprising between the intermediate layer and the cure paint layer:
   (i) a second intermediate layer of an epoxy resin or a thermoplastic acryl resin containing a material in the form of a sand selected from the group consisting of lime stone and silica, or a filler selected from the group consisting of clay and talc; said second layer formed on the previous intermediate layer.

* * * * *